(12) United States Patent
Gopalan et al.

(10) Patent No.: US 9,745,766 B2
(45) Date of Patent: Aug. 29, 2017

(54) BIODEGRADABLE DISPOSABLE DEBRIS BAG

(71) Applicant: Pentair Water Pool and Spa, Inc., Sanford, NC (US)

(72) Inventors: Suresh C. Gopalan, Milpitas, CA (US); Brian S. King, Apex, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 130 days.

(21) Appl. No.: 14/635,829

(22) Filed: Mar. 2, 2015

(65) Prior Publication Data
US 2015/0167337 A1    Jun. 18, 2015

Related U.S. Application Data (63) Continuation of application No. 12/780,616, filed on May 14, 2010, now Pat. No. 8,968,559.

(51) Int. Cl.
*E04H 4/16* (2006.01)
*B01D 29/27* (2006.01)

(52) U.S. Cl.
CPC .............. *E04H 4/16* (2013.01); *B01D 29/27* (2013.01); *E04H 4/1654* (2013.01)

(58) Field of Classification Search
CPC .......... E04H 4/16; E04H 4/1654; B01D 29/27
USPC ........... 210/167.16, 167.17, 232, 448; 15/1.7
See application file for complete search history.

(56) References Cited

U.S. PATENT DOCUMENTS

| | | | |
|---|---|---|---|
| 1,184,485 A | 5/1916 | Mummert |
| 1,302,886 A | 5/1919 | Wagner |
| 1,383,615 A | 7/1921 | Geier |
| 1,422,105 A | 7/1922 | Kirby |
| 1,553,076 A | 9/1925 | Halsted |
| 1,827,496 A | 10/1931 | Bert |
| 1,923,299 A | 8/1933 | Darling |
| 1,970,190 A | 8/1934 | Riebel, Jr. |
| 2,003,720 A | 6/1935 | Walton |
| 2,024,143 A | 12/1935 | Cameron |
| 2,047,735 A | 7/1936 | Hunsdorf |
| 2,421,067 A | 5/1947 | Howe |
| 2,528,332 A | 10/1950 | Bergquist |
| 2,637,409 A | 5/1953 | Turner et al. |
| 2,698,639 A | 1/1955 | Bottomley |
| 2,843,309 A | 7/1958 | Wheeler |
| 2,989,185 A | 6/1961 | Lombardi |
| 3,176,450 A | 4/1965 | Weinstein |
| 3,251,390 A | 5/1966 | Evans |
| 3,297,152 A | 1/1967 | Corella et al. |
| 3,367,485 A | 2/1968 | Schneider et al. |

(Continued)

FOREIGN PATENT DOCUMENTS

| | | |
|---|---|---|
| AU | 17035/34 | 4/1935 |
| AU | 646056 B2 | 2/1994 |

(Continued)

*Primary Examiner* — Fred Prince
(74) *Attorney, Agent, or Firm* — Quarles & Brady LLP (57) ABSTRACT

Some embodiments include a debris bag for a pool cleaner. The debris bag includes a sheet of filtration media that forms an opening and a hollow interior portion to capture debris from the pool cleaner. An attachment fixture is located at the opening and includes a ring having a hook area for coupling the attachment fixture to an outlet of the pool cleaner.

20 Claims, 6 Drawing Sheets

(56) References Cited

U.S. PATENT DOCUMENTS

| | | |
|---|---|---|
| 3,426,510 A | 2/1969 | Shaaf |
| 3,722,686 A | 3/1973 | Arnett et al. |
| 3,767,055 A | 10/1973 | Flatland |
| 3,822,754 A | 7/1974 | Henkin et al. |
| 3,912,140 A | 10/1975 | Franges |
| 3,932,281 A | 1/1976 | Pansini |
| 3,936,899 A | 2/1976 | Henkin et al. |
| 3,972,339 A | 8/1976 | Henkin et al. |
| 4,040,864 A | 8/1977 | Steeves |
| 4,140,163 A | 2/1979 | Usner |
| 4,296,529 A | 10/1981 | Brown |
| 4,344,274 A | 8/1982 | Heismann |
| 4,498,190 A | 2/1985 | Garlick, III |
| 4,503,559 A | 3/1985 | Warnke |
| D279,227 S | 6/1985 | Price |
| 4,558,479 A | 12/1985 | Greskovics et al. |
| 4,575,423 A | 3/1986 | Alanis et al. |
| 4,589,986 A | 5/1986 | Greskovics et al. |
| 4,618,420 A | 10/1986 | Alanis et al. |
| 4,630,312 A | 12/1986 | Milstein |
| D288,373 S | 2/1987 | Alanis |
| 4,649,589 A | 3/1987 | Dibb |
| 4,675,032 A | 6/1987 | Genovese |
| D294,963 S | 3/1988 | Alanis et al. |
| 4,746,424 A | 5/1988 | Drew |
| 4,776,954 A | 10/1988 | Brooks |
| 4,778,599 A | 10/1988 | Brooks |
| 4,839,063 A | 6/1989 | Brooks |
| 4,856,913 A | 8/1989 | Campbell |
| 4,880,531 A | 11/1989 | Blake et al. |
| 4,889,622 A | 12/1989 | Newcombe-bond |
| D310,774 S | 9/1990 | Collins |
| D311,796 S | 10/1990 | Collins |
| 5,003,758 A | 4/1991 | Bernstein |
| 5,031,277 A | 7/1991 | Coker |
| 5,077,853 A | 1/1992 | Campbell |
| 5,088,667 A | 2/1992 | Olson |
| 5,173,181 A | 12/1992 | McFarland |
| 5,240,484 A | 8/1993 | Genovese |
| 5,336,403 A | 8/1994 | Marbach |
| 5,370,597 A | 12/1994 | Genovese |
| 5,417,495 A | 5/1995 | Branson |
| 5,450,644 A | 9/1995 | Bermann |
| 5,536,397 A | 7/1996 | D'Offay |
| D376,450 S | 12/1996 | Campbell et al. |
| 5,603,135 A | 2/1997 | Jones et al. |
| D379,693 S | 6/1997 | Campbell et al. |
| 5,760,118 A | 6/1998 | Sinclair et al. |
| 5,771,532 A | 6/1998 | Munnoch |
| 5,813,092 A | 9/1998 | Greenfield |
| 5,863,425 A | 1/1999 | Herlehy et al. |
| 5,893,188 A | 4/1999 | Campbell et al. |
| D409,341 S | 5/1999 | Van Etten et al. |
| 5,919,359 A | 7/1999 | Bisseker |
| 5,996,906 A | 12/1999 | Cooper |
| 6,027,641 A | 2/2000 | Spradbury et al. |
| 6,071,322 A | 6/2000 | Hulthen |
| D429,393 S | 8/2000 | Rief |
| 6,131,227 A | 10/2000 | Rief |
| 6,169,045 B1 | 1/2001 | Pike et al. |
| 6,193,885 B1 | 2/2001 | Campbell |
| D438,373 S | 3/2001 | Riley |
| 6,241,899 B1 | 6/2001 | Ramos |
| 6,292,970 B1 | 9/2001 | Rief |
| 6,302,277 B1 | 10/2001 | Resh |
| 6,358,410 B1 | 3/2002 | Lambert |
| D468,067 S | 12/2002 | Stoltz et al. |
| 6,706,175 B1 | 3/2004 | Rief et al. |
| 6,740,233 B2 | 5/2004 | Stoltz et al. |
| 6,782,578 B1 | 8/2004 | Rief |
| 6,786,947 B2 | 9/2004 | Mountford |
| 6,802,879 B2 | 10/2004 | Scanlon |
| 6,802,963 B2 | 10/2004 | Campbell |
| 6,854,148 B1 | 2/2005 | Rief |
| 6,908,550 B2 | 6/2005 | Silverstein |
| 7,029,583 B2 | 4/2006 | Meritt-Powell |
| 7,208,083 B2 | 4/2007 | Meritt-Powell |
| 7,273,546 B2 | 9/2007 | Meritt-Powell |
| 7,575,675 B2 | 8/2009 | Gopalian |
| 2002/0030009 A1* | 3/2002 | Lin ............... B01D 67/0011 210/483 |
| 2003/0070980 A1 | 4/2003 | Ray |
| 2004/0007522 A1 | 1/2004 | Garti |
| 2004/0047522 A1 | 3/2004 | Thibault |
| 2005/0029177 A1 | 2/2005 | Peterson, Jr. et al. |
| 2005/0040089 A1 | 2/2005 | Meritt-Powell |
| 2005/0236310 A1 | 10/2005 | Meritt-Powell |
| 2005/0279682 A1 | 12/2005 | Davidson et al. |
| 2008/0124791 A1 | 5/2008 | Bucci |
| 2008/0202997 A1 | 8/2008 | Davidson et al. |
| 2008/0264029 A1 | 10/2008 | Sepaniak |
| 2012/0152316 A1 | 6/2012 | Fischer et al. |
| 2013/0152316 A1 | 6/2013 | Rief |
| 2014/0042063 A1 | 2/2014 | Rief |

FOREIGN PATENT DOCUMENTS

| | | |
|---|---|---|
| AU | 20003200301 A1 | 8/2003 |
| AU | 2005200122 A1 | 8/2005 |
| AU | 2005200432 A1 | 8/2005 |
| AU | 20052011246 A1 | 3/2006 |
| AU | 2005291860 B2 | 4/2006 |
| AU | 2006233248 B2 | 5/2007 |
| AU | 2005239668 A1 | 6/2007 |
| AU | 200732796 A1 | 6/2008 |
| AU | 2008312342 A1 | 4/2009 |
| AU | 2008319307 A1 | 5/2009 |
| AU | 2008357276 A1 | 12/2009 |
| AU | 2009302593 A1 | 4/2010 |
| AU | 2006235806 B2 | 12/2011 |
| AU | 2006350955 B2 | 12/2011 |
| AU | 2011244897 A1 | 5/2012 |
| AU | 2012203886 A1 | 7/2012 |
| AU | 200732716 B2 | 8/2012 |
| AU | 2007332769 B2 | 8/2012 |
| AU | 2012244365 A1 | 11/2012 |
| AU | 2007261424 B2 | 5/2013 |
| AU | 2007244852 B2 | 9/2013 |
| AU | 2012258346 A1 | 12/2013 |
| AU | 2013266997 A1 | 1/2014 |
| AU | 2014200515 A1 | 2/2014 |
| AU | 20007261425 B2 | 5/2014 |
| AU | 2014202995 A1 | 6/2014 |
| AU | 2014202996 A1 | 6/2014 |
| AU | 2014208211 A1 | 8/2014 |
| AU | 201421832 A1 | 3/2015 |
| DE | 10159354 A1 | 11/2002 |
| GB | 2420116 A1 | 5/2006 |
| JP | 09-272601 | 10/1997 |
| NZ | 239016 A | 3/1993 |
| WO | 00/21639 A1 | 4/2000 |
| WO | 2005/019565 A2 | 3/2005 |
| WO | 2008173329 A2 | 6/2008 |
| WO | 2009/052412 A1 | 4/2009 |
| WO | 2009/005297 A3 | 5/2009 |
| WO | 2009/146479 A1 | 12/2009 |
| WO | 2010/042406 A1 | 4/2010 |
| WO | 2010/088619 A1 | 8/2010 |
| WO | 2011/041444 A1 | 4/2011 |
| WO | 2011/063463 A1 | 6/2011 |
| WO | 2011088493 A1 | 7/2011 |
| WO | 2012/037435 A3 | 3/2012 |
| WO | 2012/078862 A3 | 6/2012 |
| WO | 2013/052351 A1 | 4/2013 |
| WO | 2013/052352 A1 | 4/2013 |
| WO | 2013/052356 A1 | 4/2013 |
| WO | 2013/057479 A1 | 4/2013 |
| WO | 2013/067206 A1 | 5/2013 |
| ZA | 1986/06841 | 9/1986 |
| ZA | 1989/01785 | 11/1989 |
| ZA | 91/5471 | 1/1993 |
| ZA | 1995/09103 | 10/1995 |
| ZA | 1995/09993 | 5/1996 |
| ZA | 1996/05947 | 3/1997 |

(56) References Cited

FOREIGN PATENT DOCUMENTS

| | | |
|---|---|---|
| ZA | 1998/06933 | 4/1999 |
| ZA | 1999/7765 | 6/2000 |
| ZA | 2001/00202 | 1/2001 |

\* cited by examiner

BIODEGRADABLE DISPOSABLE DEBRIS BAG

CROSS REFERENCE TO RELATED APPLICATIONS

This application claims the benefit of U.S. patent application Ser. No. 12/780,616 filed on May 14, 2010, the entire contents of which are incorporated herein by reference.

BACKGROUND

Pressure-driven pool cleaners include a debris bag to hold captured debris. Conventional debris bags are reusable and must be cleaned out periodically. Cleaning wet reusable debris bags (which can contain anything from leaves to rotten bugs) can be very tedious and can allow some captured debris to spill back into the pool. Compared to reusable debris bags, disposable debris bags can allow users to save a significant amount of time and effort.

SUMMARY

Some embodiments provide a debris bag for a pool cleaner. The debris bag includes a sheet of filtration media that forms an opening and a hollow interior portion to capture debris from the pool cleaner. An attachment fixture is located at the opening and includes a ring having a hook area for coupling the attachment fixture to an outlet of the pool cleaner.

Other embodiments include a disposable debris bag for a pool cleaner. The debris bag has a sheet of filtration media that forms a single opening. The filtration media has a permeability between about 900 cfm/ft$^2$ and about 1,200 cfm/ft$^2$. The debris bag also includes a hollow interior portion to capture debris from the pool cleaner. An attachment fixture is associated with the opening and has a hook area for coupling the attachment fixture to an outlet of the pool cleaner.

Additional embodiments include a pressure-side pool cleaner assembly. The pool cleaner assembly includes a pool cleaner body having a circular outlet extending from an upper portion of the body and a plurality of wheels associated with the pool cleaner. A debris bag is coupled to the outlet. The debris bag includes a sheet of filtration media that forms an opening and a hollow interior portion to capture debris from the pool cleaner. An attachment fixture circumscribes the opening and includes an inner ring that surrounds the opening and an outer ring that surrounds the inner ring.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
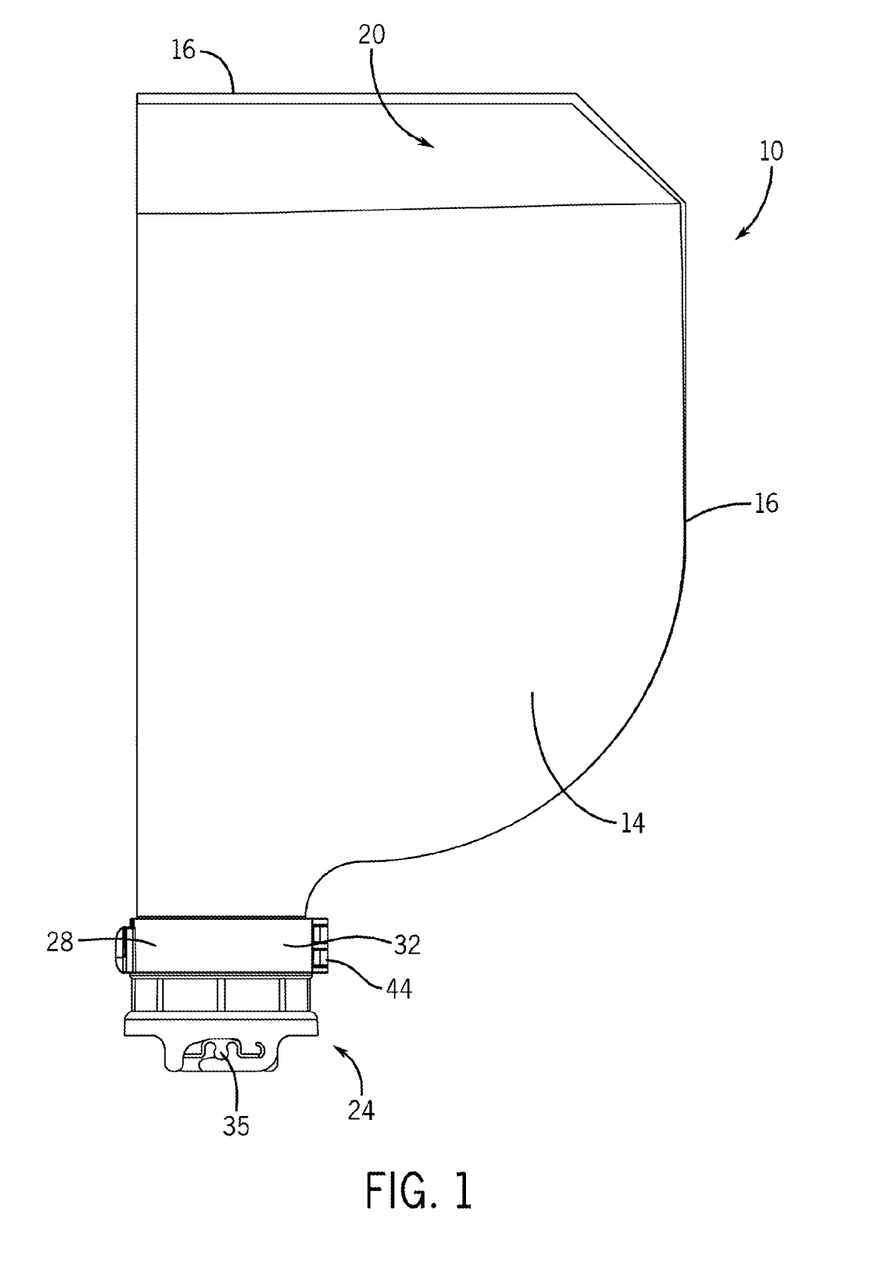
FIG. 1 is a perspective view of a debris bag according to one embodiment of the invention.
Figure 2:
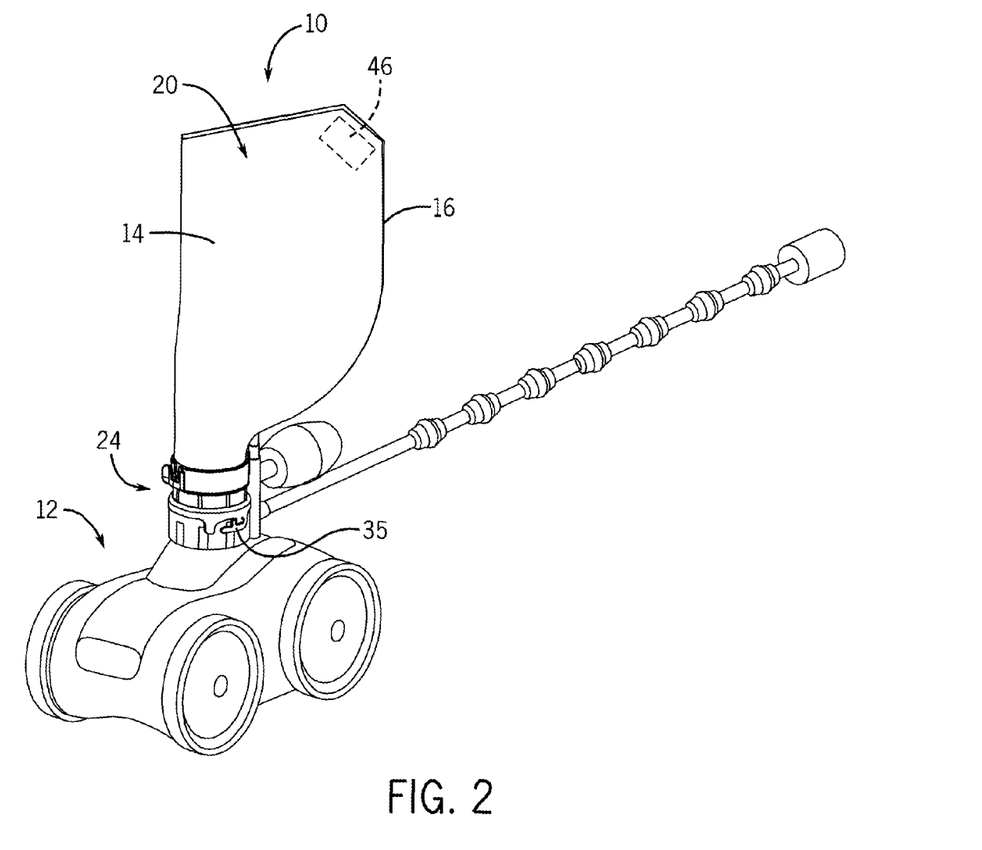
FIG. 2 is perspective view of the debris bag of FIG. 1 coupled to a pool cleaner.

FIG. 1 illustrates a biodegradable, disposable debris bag 10 according to one embodiment of the invention. The debris bag 10 can be coupled to an outlet of a pool cleaner 12, as shown in FIG. 2, to capture debris collected by the pool cleaner 12. The debris bag 10 can be constructed of a biodegradable fabric filtration media 14 and thread 16.

Figure 3:
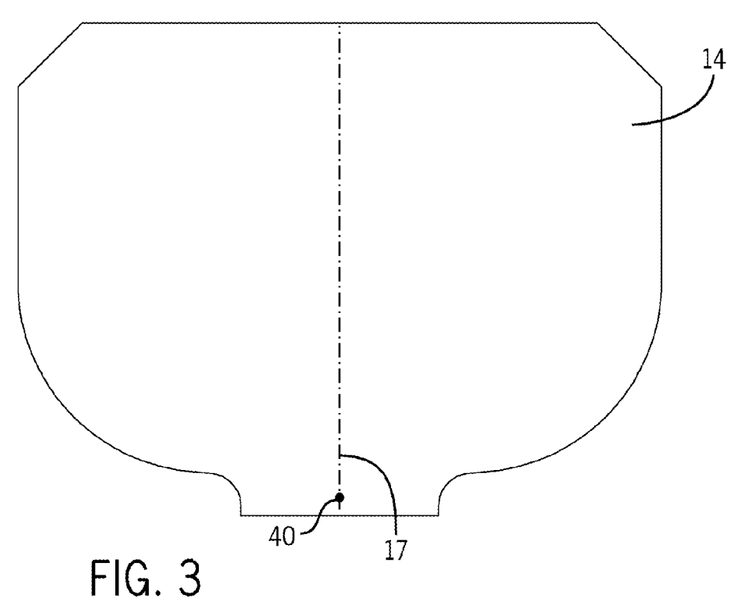
FIG. 3 is front view of the debris bag of FIG. 1 in an unconstructed state.
Figure 4:
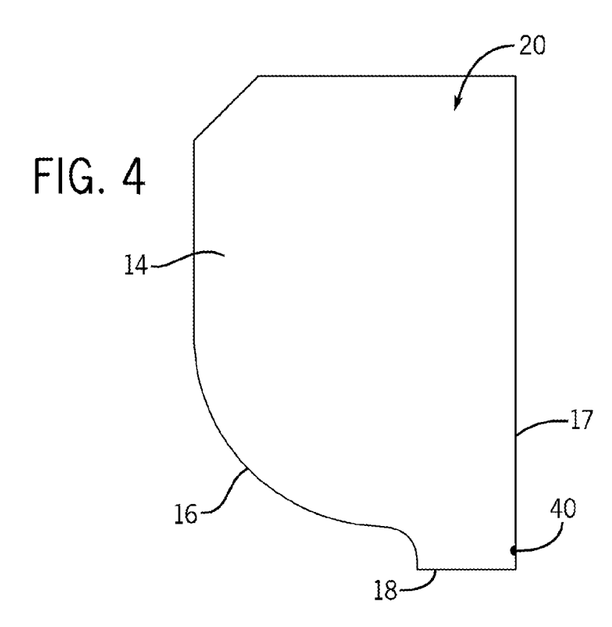
FIG. 4 is a front view of the debris bag of FIG. 1 in a constructed state.

FIGS. 3 and 4 illustrate the debris bag 10 in an unconstructed state and a constructed state, respectively. In some embodiments, as shown in FIG. 3, the debris bag 10 can be constructed of a single piece of biodegradable fabric filtration media 14. The single piece of biodegradable fabric filtration media 14 can be folded over at a fold line 17 and stitched together with the thread 16, as shown in FIG. 4. A portion of the debris bag 10 can remain separated (i.e., not stitched together) to create an opening 18. In one embodiment, the debris bag 10, when laid flat as shown in FIG. 4, can be about 16 inches long. The width of a top portion 20 of the debris bag 10 can be about 10 inches and can taper down toward the opening 18. In some embodiments, the opening 18 can have a diameter of about 5 inches.

Figure 5A:
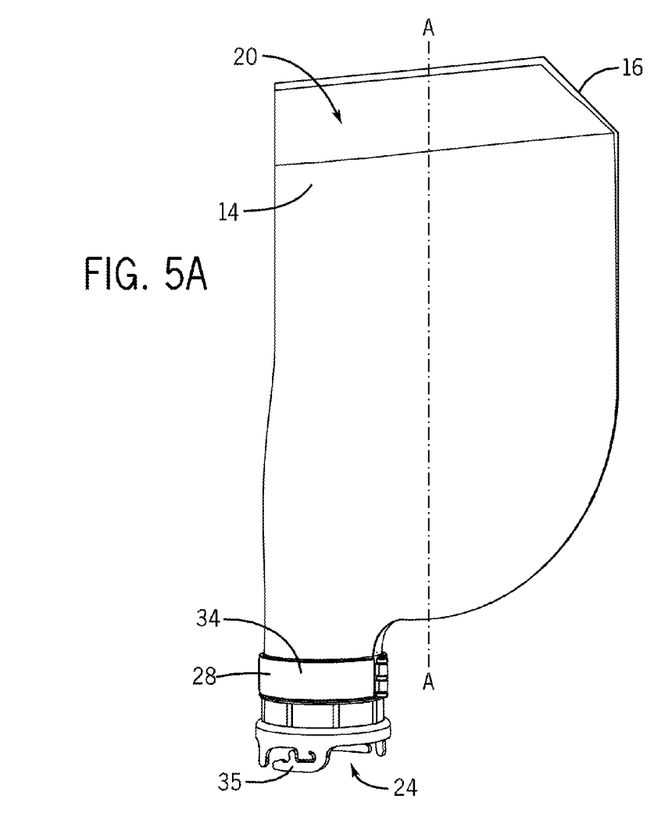
FIG. 5A is another perspective view of the debris bag of FIG. 1.
Figure 5B:
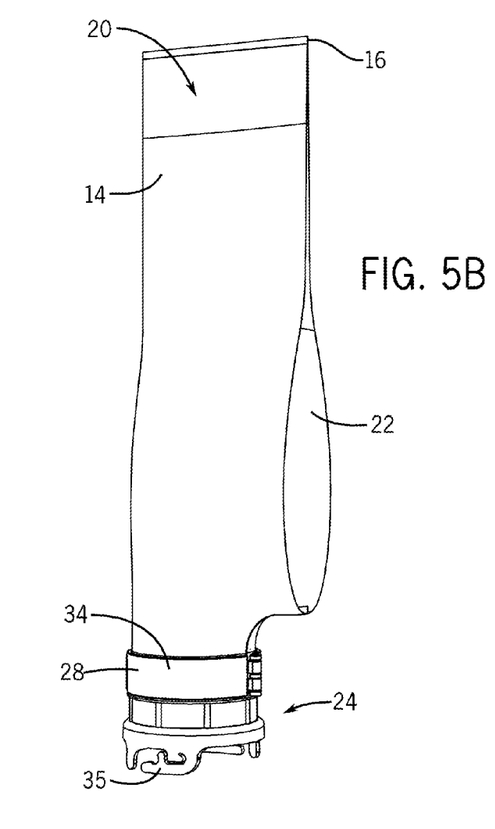
FIG. 5B is a cross-sectional perspective view of the debris bag of FIG. 5A split along line A-A.

As shown in FIGS. 5A and 5B, the debris bag 10 can be stitched together to create a hollow interior portion 22. Edge portions as well as other portions of the debris bag 10 can include stitching in some embodiments. The debris bag 10 can be stitched with the thread 14 using a suitable stitch pattern, such as an overlock stitch pattern. The overlock stitch pattern can be about 5/32 inches in width and can be located on the inside of the debris bag 10 (i.e., within the hollow interior portion 22). In addition, the opening 18 can be reinforced by using the overlock stitch pattern around its circumference. In some embodiments, the thread 16 can be bonded polyester thread.

FIGS. 5A and 5B also illustrate an attachment fixture 24 at the opening 18. The opening 18 can be coupled to and in communication with an outlet of the pool cleaner 12 via the attachment fixture 24 (as shown in FIG. 2). As a result, when debris exits the pool cleaner 12 at its outlet, it can travel through the opening 18 and can be captured inside the hollow interior portion 22. The hollow interior portion 22 can be a single chamber large enough to accommodate debris such as leaves.

Figure 6A:
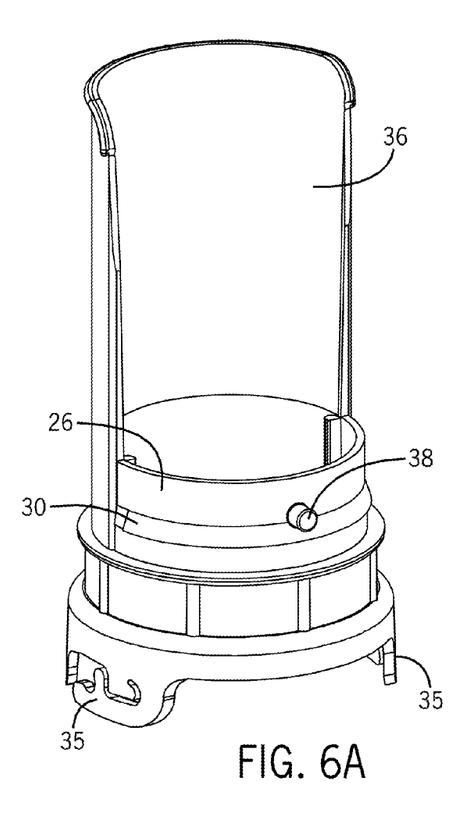
FIGS. 6A and 6B are perspective views of components of an attachment fixture for use with the debris bag, according to one embodiment of the invention.
Figure 6B:
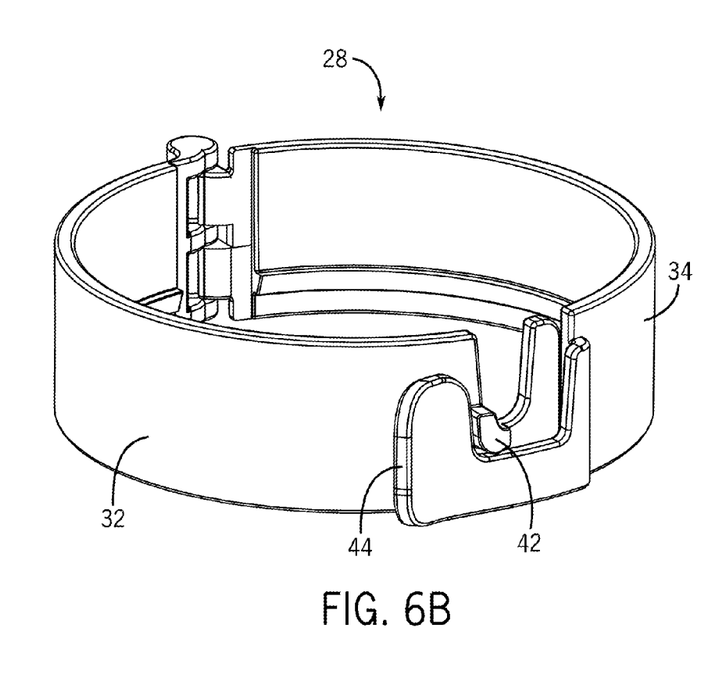

FIGS. 6A and 6B illustrate components of the attachment fixture 24. In some embodiments, the attachment fixture 24 can include an inner ring 26 (as shown in FIG. 6A) and an outer ring 28 (as shown in FIG. 6B). The inner ring 26 can be equipped with a flexible sand flap 30 and the outer ring 28 can include a first outer ring half 32 and a second outer ring half 34 hinged together. The attachment fixture 24 can also include hook areas 35 for coupling the attachment fixture 24 to the outlet of the pool cleaner 12. In addition, as shown in FIG. 6A, a support fixture 36 can be coupled to the attachment fixture 24 to support the debris bag 10 in an upright position.

Figures 7A, 7B, 7C:
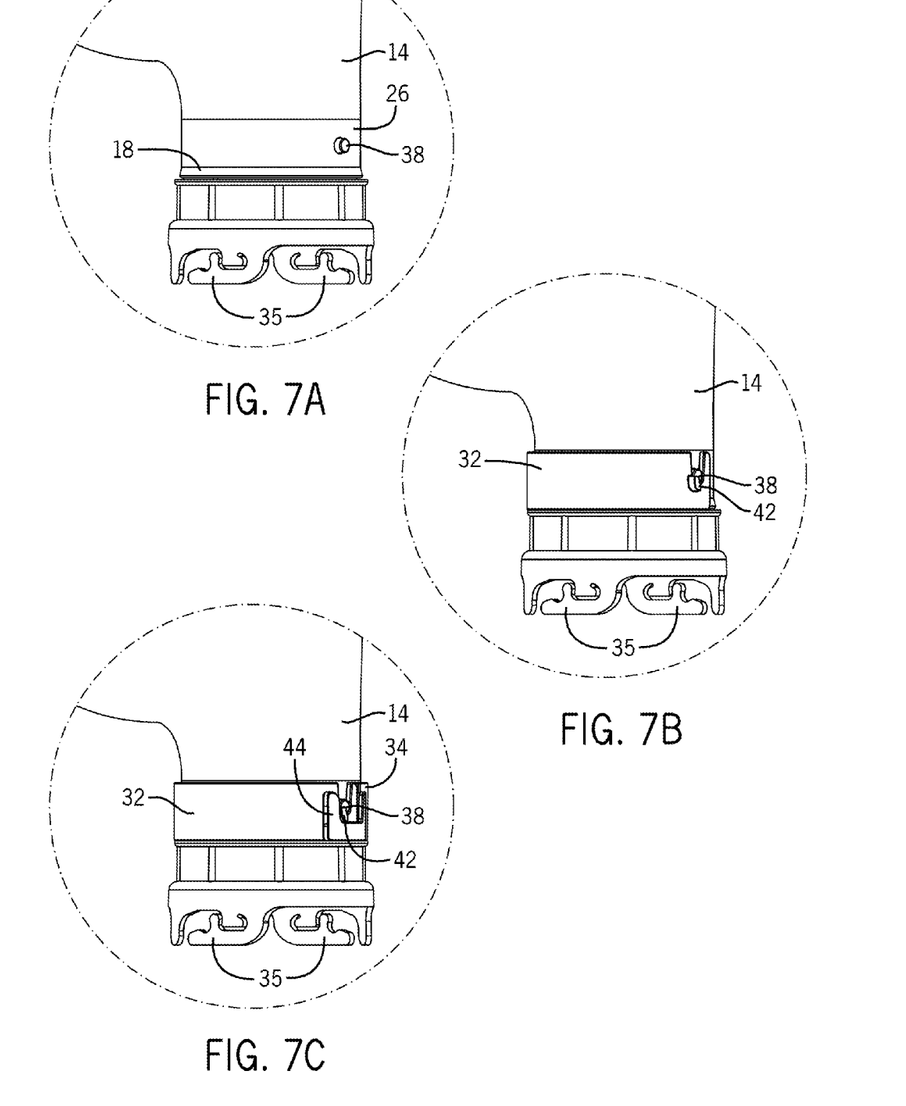
FIGS. 7A-7C are perspective partial views of a sequence illustrating a debris bag being secured to an attachment fixture, according to one embodiment of the invention.

FIGS. 7A-7C illustrate steps for securing the opening 18 to the attachment fixture 24. As shown in FIG. 7A, the opening 18 can fit over the inner ring 26. In one embodiment, the inner ring 26 can include a round pin 38 and the debris bag 10 can include a pin hole 40 (as shown in FIGS. 3 and 4) that fits over the round pin 38 when the opening 18 is slipped over the inner ring 26. The two halves 32, 34 of the outer ring 28 can wrap around the inner ring 26 and snap together to hold the debris bag 10 in place, acting as a bag clamp by pressing the debris bag against the inner ring 26 and the sand flap 30. More specifically, after the debris bag 10 is slipped onto the inner ring 26, the first outer ring half 32 can be hooked around the round pin 38 and wrapped around the inner ring 26, as shown in FIG. 7B. Then, as shown in FIG. 7C, the second outer ring half 34 can wrap around the inner ring 26, over the round pin 38, and snap onto the first outer ring half 32 via, for example, a snap 42 on the first outer ring half 32 and a snap lip 44 on the second outer ring half 34. The round pin 38 and the pin hole 40 can help secure the debris bag 10 in place and can help prevent the debris bag 10 from slipping off the attachment fixture 24 when the outer ring 28 is snapped together. In some embodiments, the biodegradable fabric filtration media 14 at the circumference of the pin hole 40 can be melted for increased strength. To detach the debris bag 10 from attachment fixture 24, the snap lip 44 can be pushed outward and released from the snap 42. The outer ring 28 can then be unwrapped and the debris bag 10 can be slipped off the inner ring 26.

The debris bag 10 can be used with a pressure-side pool cleaner 12, such as a Legend® series pool cleaner, manufactured by Pentair Water Pool and Spa, Inc. Pressure side pool cleaners 12 generally depend on a venturi system to move debris with the help of moving water from the bottom of the pool through a vacuum tube to the outlet and into the debris bag 10. The water can then flow out of the debris bag 10, while the debris remains inside the debris bag 10. Any restriction to the flow generated by venturi system, such as water being restricted from flowing out of the debris bag 10, reduces the speed of water, and thus, reduces the amount of debris pick up. In some embodiments, the biodegradable fabric filtration media 14 can have a permeability (i.e., air permeability) between about 900 cubic feet per minute per square foot (cfm/ft$^2$) and about 1200 cfm/ft$^2$. The permeability of the biodegradable fabric filtration media 14 in some embodiments can permit better (i.e., less inhibited) water flow through the debris bag 10 compared to other disposable debris bags. Due to the higher permeability of the biodegradable fabric filtration media 14, water can move up and through the debris bag 10 with less restriction compared to conventional disposable debris bags, even when there is considerable debris present. Other embodiments can use different types of biodegradable fabric with different permeabilities. In some embodiments, the biodegradable fabric filtration media 14 can be non-woven polylactic acid (PLA) fabric or non-woven polyhydroxy butyrate (PHB) fabric, and can have a thickness between about 0.006 inches and about 0.012 inches.

When the debris bag 10 is full, it can be separated from the pool cleaner 12 and the attachment fixture 24, as described above, and disposed of with the debris. Due to the biodegradable fabric filtration media 14, the entire debris bag 10 can be biodegradable, and thus, not harmful to the environment. In some embodiments, the debris bag 10 can degrade entirely in about five years.

In some embodiments, the pool clearer 12 can include a float 46, as shown in FIG. 2. In some embodiments, the float 46 can be coupled to the top of the debris bag 10, along the inside or outside of the debris bag 10, to keep the debris bag 10 upright and prevent it from affecting the movement of the pool cleaner 12. In one embodiment, the float 46 can be similar to that described in U.S. Pat. No. 6,193,885, the entire contents of which is incorporated herein by reference.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A debris bag for a pool cleaner, the debris bag comprising:
   a sheet of filtration media that forms an opening;
   a hollow interior portion to capture debris from the pool cleaner; and
   an attachment fixture at the opening, the attachment fixture including a ring having a hook area for coupling the attachment fixture to an outlet of the pool cleaner, the ring including a first outer ring half and a second outer ring half hinged together and secured around an inner ring.

2. The debris bag of claim 1, wherein the hook area is disposed adjacent a bottom edge of the attachment fixture.

3. The debris bag of claim 1, wherein the hook area is defined by two hook areas disposed on opposing sides of the attachment fixture.

4. The debris bag of claim 3, wherein the hook areas each include a slot for interacting with the pool cleaner.

5. The debris bag of claim 1 further including a pin hole.

6. The debris bag of claim 5, wherein the ring includes a pin.

7. The debris bag of claim 6, wherein the debris bag is at least partially secured to the ring when the pin is inserted into the pin hole.

8. The debris bag of claim 1 further including a support fixture disposed within the debris bag to support the debris bag in an upright position when the attachment fixture is coupled to the pool cleaner.

9. The debris bag of claim 1, wherein the debris bag only includes a single opening.

10. A disposable debris bag for a pool cleaner, the debris bag comprising:
   a sheet of filtration media that forms a single opening, the filtration media having a permeability between about 900 cfm/ft$^2$ and about 1,200 cfm/ft$^2$;
   a hollow interior portion to capture debris from the pool cleaner; and
   an attachment fixture associated with the opening, the attachment fixture having a hook area for coupling the attachment fixture to an outlet of the pool cleaner.

11. The debris bag of claim 10, wherein the filtration media is one of non-woven polylactic acid fabric or non-woven polyhydroxy butyrate.

12. The debris bag of claim 10, wherein the filtration media has a thickness of between about 0.0006 inches and about 0.012 inches.

13. The debris bag of claim 10, wherein the attachment fixture includes an inner ring and an outer ring.

14. The debris bag of claim 13, wherein the outer ring is wrapped around the inner ring to secure the debris bag to the attachment fixture.

15. The debris bag of claim 14, wherein the outer ring is defined by a first outer ring half and a second outer ring half that are hinged together.

16. A pressure-side pool cleaner assembly, the pool cleaner assembly comprising:
   a pool cleaner body having a circular outlet extending from an upper portion of the body;
   a plurality of wheels associated with the pool cleaner; and
   a debris bag coupled to the outlet, the debris bag including
      a sheet of filtration media that forms an opening;
      a hollow interior portion to capture debris from the pool cleaner; and
   an attachment fixture circumscribing the opening, the attachment fixture including an inner ring that receives the opening and an outer ring that surrounds the inner ring, the outer ring defined by a first outer ring half and a second outer ring half that are hinged together.

17. The pool cleaner assembly of claim 16, wherein the outer ring snaps together to couple the debris bag to the attachment fixture.

18. The pool cleaner assembly of claim 16, wherein the filtration media has a permeability between about 900 cfm/ft$^2$ and about 1,200 cfm/ft$^2$.

19. The pool cleaner assembly of claim 16, wherein the debris bag extends substantially upright from the outlet.

20. The pool cleaner assembly of claim 16, wherein the attachment fixture includes two hook areas for coupling the attachment fixture to the outlet of the pool cleaner.

* * * * *